United States Patent
Harada

(10) Patent No.: US 8,520,964 B2
(45) Date of Patent: Aug. 27, 2013

(54) IMAGE PROCESSING APPARATUS

(75) Inventor: Hiroyuki Harada, Osaka (JP)

(73) Assignee: KYOCERA Document Solutions Inc. (JP)

( * ) Notice: Subject to any disclaimer, the term of this patent is extended or adjusted under 35 U.S.C. 154(b) by 589 days.

(21) Appl. No.: 12/824,808

(22) Filed: Jun. 28, 2010

(65) Prior Publication Data

US 2010/0329580 A1 Dec. 30, 2010

(30) Foreign Application Priority Data

Jun. 29, 2009 (JP) .................................. 2009-154190

(51) Int. Cl.
*G06K 9/36* (2006.01)
*G06K 9/46* (2006.01)

(52) U.S. Cl.
USPC ......................................................... 382/246

(58) Field of Classification Search
None
See application file for complete search history.

(56) References Cited

U.S. PATENT DOCUMENTS

| 7,663,906 B2 * | 2/2010 | Fukada .......................... 365/145 |
| 8,218,642 B2 * | 7/2012 | Gao et al. .................. 375/240.16 |
| 2009/0274365 A1 * | 11/2009 | Tsuda et al. ................... 382/166 |
| 2012/0149303 A1 * | 6/2012 | Moes et al. .................. 455/41.1 |

FOREIGN PATENT DOCUMENTS

JP 2000-101807 7/2000

\* cited by examiner

*Primary Examiner* — Samir Ahmed
(74) *Attorney, Agent, or Firm* — McDonnell Boehnen Hulbert & Berghoff LLP

(57) ABSTRACT

Provided is an image processing apparatus sequentially performing image processing on multiple pieces of band data composing image data. The image processing apparatus includes a RAM and a JPEG encoding circuit. The RAM has a buffer area of a fixed length. The JPEG encoding circuit sequentially performs variable-length encoding on multiple pieces of band data, sequentially writes the band data subjected to the encoding from the beginning of the buffer area, and writes subsequent band data subjected to the encoding from the beginning of the buffer area if the end of the band data subjected to the encoding is positioned in a boundary area having a certain length including an ending part of the buffer area.

20 Claims, 5 Drawing Sheets

IMAGE PROCESSING APPARATUS

INCORPORATION BY REFERENCE

This application is based upon and claims the benefit of priority from corresponding Japanese Patent Application No. 2009-154190, filed Jun. 29, 2009, the entire contents of which is incorporated herein by reference.

BACKGROUND

1. Field of the Invention

The present invention relates to an image processing apparatus.

2. Description of the Related Art

An image processing apparatus performs variable-length compression on image data and stores the compressed image data in a page memory. Then, the image processing apparatus reads out the image data from the page memory and spools the image data in a hard disk drive. The page memory is, for example, a ring buffer. In the ring buffer, data is sequentially stored from the beginning of the storage area to the end thereof and, when the data reaches the end of the storage area, the subsequent data is stored from the beginning of the storage area.

However, in the case of an image processing apparatus that sequentially performs image processing on multiple pieces of band data composing image data, if the data subjected to the variable-length compression is stored in the ring buffer in the above-described manner, the position where the data is written reaches the end of the storage area at the time when part of the band data is stored in the ring buffer. As a result, the remaining part of the band data is written from the beginning of the ring buffer. Accordingly, the addresses of the storage positions become discontinuous in the middle of the band data and a delay occurs in writing and readout of the data in the discontinuous positions due to address calculation, thus causing a delay in the image processing. In particular, when the pieces of band data are sequentially subjected to pipeline processing in multiple image processing apparatuses, the efficiency of the pipeline processing is reduced if a delay occurs in the writing and readout of data into the memory.

When the compressed data has a fixed length, the discontinuity of the addresses of the storage positions does not occur in the middle of the compressed band data if the size of the storage area of the ring buffer is made an integral multiple of the size of the compressed band data. However, since the size of the data subjected to the variable-length compression is varied depending on the content of the data, the above-described problems occur.

SUMMARY

The present disclosure relates to an image processing apparatus that prevents a delay in writing and readout of band data subjected to encoding by storing the pieces of band data subjected to the encoding at successive addresses.

An image processing apparatus according to one embodiment of the present disclosure performs image processing on band data and comprises a memory and a variable-length encoding circuit. The memory includes a buffer area of a fixed length. The variable-length encoding circuit sequentially performs variable-length encoding on the band data, sequentially writes the band data subjected to the encoding from the beginning of the buffer area, and writes subsequent band data subjected to the encoding from the beginning of the buffer area when the end of the band data subjected to the encoding is positioned in a boundary area including an ending part of the buffer area.

An image processing method according to another embodiment of the present disclosure performs image processing on band data. The image processing method comprises an encoding step of sequentially performing variable-length encoding on the band data, and a writing step of sequentially writing the band data subjected to the encoding from the beginning of a buffer area having a fixed length in a memory and writing subsequent band data subjected to the encoding from the beginning of the buffer area when the end of the band data subjected to the encoding is positioned in a boundary area including an ending part of the buffer area.

Additional features and advantages are described herein, and will be apparent from the following Detailed Description and the figures.

DETAILED DESCRIPTION

Figure 1:
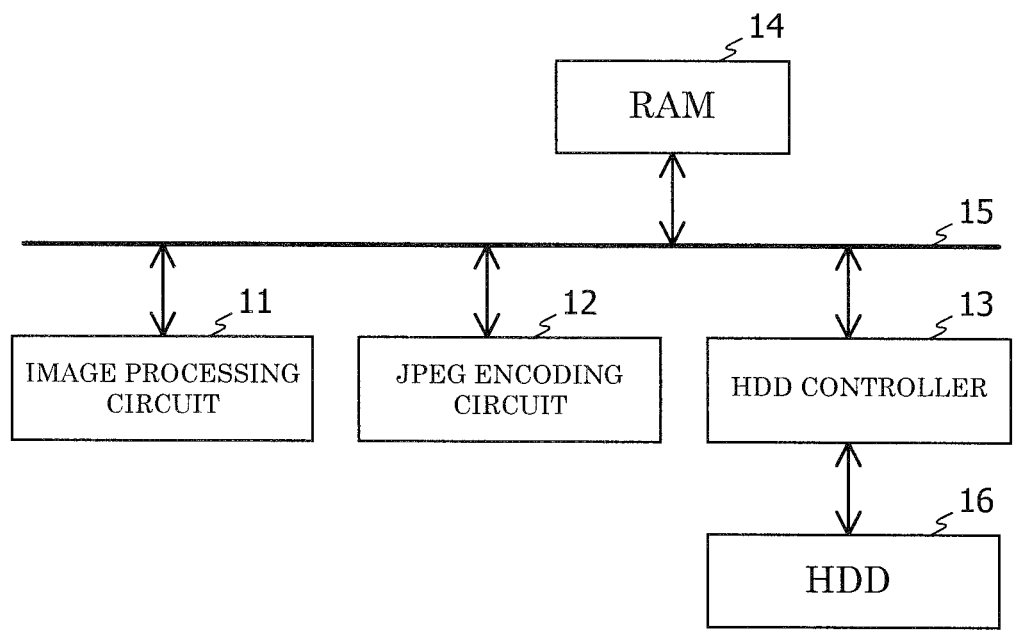
FIG. 1 is a block diagram illustrating an example of the configuration of an image processing apparatus according to an embodiment of the present invention.

FIG. 1 is a block diagram illustrating an example of the configuration of an image processing apparatus according to an embodiment of the present invention. The image processing apparatus is provided in an image forming apparatus, such as a printer, a copier, or a multifunction peripheral (MFP), and performs processing on image data supplied from a host apparatus or image data generated in the image forming apparatus.

In the image processing apparatus illustrated in FIG. 1, an image processing circuit 11, a Joint Photographic Experts Group (JPEG) encoding circuit 12, an hard disk drive (HDD) controller 13, and a random access memory (RAM) 14 are connected to a bus 15. An HDD 16 is connected to the HDD controller 13. In addition to the above circuits and components, for example, a circuit that externally acquires image data, etc. and stores the acquired data in the RAM 14 and one or more image processing circuits (other than the image processing circuit 11 and the JPEG encoding circuit 12), which are not illustrated in FIG. 1, are appropriately connected to the bus 15.

The image processing circuit 11 reads out each piece of band data composing image data and attribute data acquired by, for example, a scanner from the RAM 14, performs image processing (image enlargement, image reduction, image rotation, color conversion, etc.) on the band data, and stores the band data subjected to the image processing in the RAM 14. The image processing circuit 11 includes an input Direct Memory Access (DMA) controller that reads out the band data from the RAM 14 and an output DMA controller that writes the band data subjected to the image processing in the RAM 14. Accordingly, the image processing circuit 11 writes the band data subjected to the image processing with the output DMA controller and reads out the band data with the input DMA controller.

The JPEG encoding circuit 12 is a variable-length encoding circuit. The JPEG encoding circuit 12 reads out the band data stored in the RAM 14 to encode and compress the readout band data in the JPEG format. The JPEG encoding circuit 12 sequentially performs the variable-length encoding on each piece of band data stored in the RAM 14 and sequentially writes the band data subjected to the encoding from the beginning of a buffer area of the RAM 14. If the end of the band data subjected to the encoding is positioned in a boundary area having a predetermined length and including an ending part of the buffer area, the JPEG encoding circuit 12 writes the subsequent band data subjected to the encoding from the beginning of the buffer area. The JPEG encoding circuit 12 includes an input DMA controller that reads out the band data from the RAM 14 and an output DMA controller that writes the band data subjected to the encoding in the RAM 14. Accordingly, the JPEG encoding circuit 12 performs the encoding while reading out the band data with the input DMA controller and writes the band data subjected to the encoding in the buffer area with the output DMA controller. The band data subjected to the encoding is hereinafter referred to as "compressed band data".

The HDD controller 13 reads out and writes data from and to the HDD 16. For example, the HDD controller 13 sequentially reads out the compressed band data corresponding to one page and stores the compressed band data in the HDD 16.

The RAM 14 includes the buffer area having a fixed length. In other words, part of the storage area or the entire storage area of the RAM 14 is allocated as the buffer area.

Figure 2:
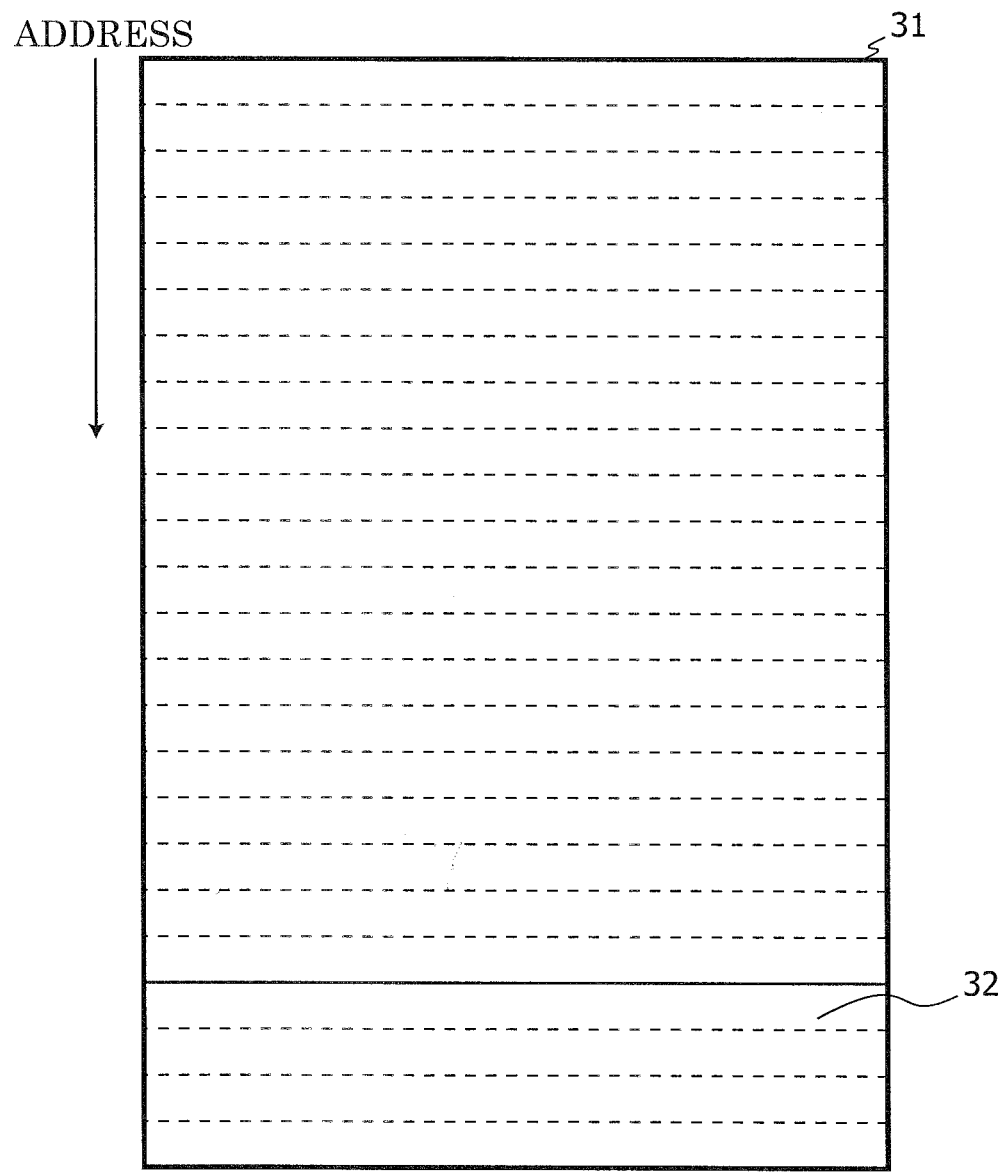
FIG. 2 illustrates an example of a buffer area provided in a RAM in FIG. 1.

FIG. 2 illustrates an example of the buffer area provided in the RAM 14 in FIG. 1. A buffer area 31 is a storage area having a fixed length, provided in the RAM 14. The size of the buffer area 31 is determined on the basis of the variable-length encoding method and the data compression ratio in the variable-length encoding method.

A boundary area 32 having a predetermined length is set in the ending part of the buffer area 31. The size of the boundary area 32 is determined on the basis of the data compression ratio in the encoding method (JPEG in this example) in the JPEG encoding circuit 12. In addition, the boundary area 32 has a size that is larger than or equal to the maximum size of the compressed band data generated by the JPEG encoding circuit 12. In this example, the size of the boundary area 32 is set to the maximum size of the compressed band data generated by the JPEG encoding circuit 12.

An example of the operation of the image processing apparatus will now be described.

The JPEG encoding circuit 12 sequentially reads out the band data from the RAM 14 and encodes the readout band data with the input DMA controller. The JPEG encoding circuit 12 writes the band data subjected to the encoding in the buffer area 31 with the output DMA controller. The JPEG encoding circuit 12 starts the encoding of the subsequent piece of band data when the encoding of one piece of band data is finished. The JPEG encoding circuit 12 repeats the above process until the processing of the pieces of band data composing the image data corresponding to the one page is completed.

Figure 3:
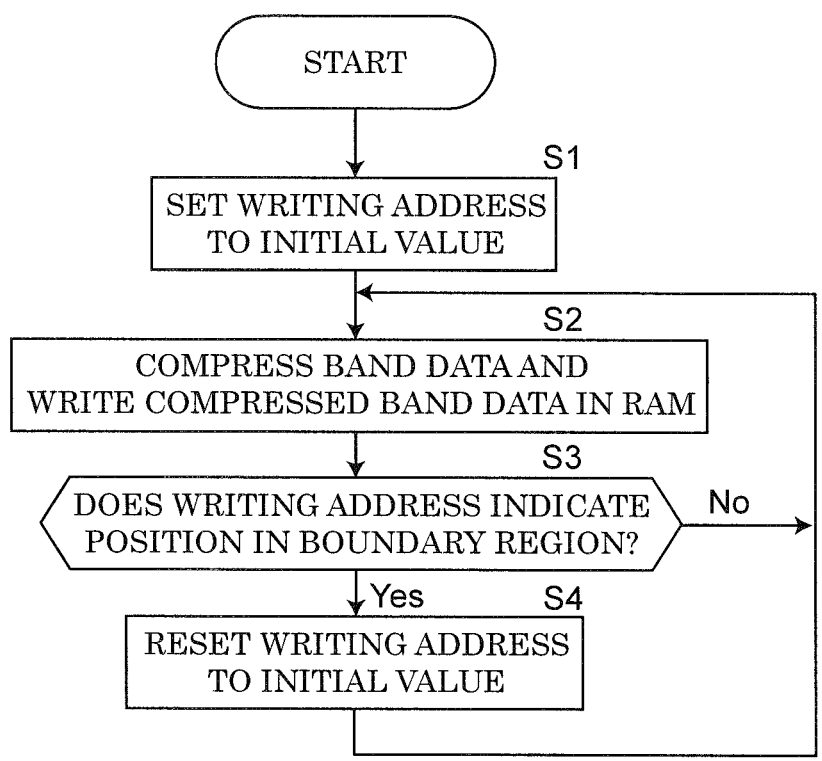
FIG. 3 is a flowchart illustrating an example of the calculation of a writing address in the RAM with a JPEG encoding circuit in FIG. 1.

The JPEG encoding circuit 12 calculates a writing address when the JPEG encoding circuit 12 writes each piece of compressed band data in the buffer area 31. FIG. 3 is a flowchart illustrating an example of the calculation of the writing address in the RAM 14 with the JPEG encoding circuit 12 in FIG. 1.

In Step S1, the JPEG encoding circuit 12 sets the writing address to an initial value (the first address of the buffer area 31) upon starting of the writing of the compressed band data.

In Step S2, the JPEG encoding circuit 12 encodes the band data in units of a predetermined size and sequentially writes the compressed band data so as to be continuous in the buffer area 31 while advancing the writing address by the amount corresponding to the written data. The band data is encoded and the compressed band data is stored in Step S2. The size of the compressed band data is varied depending on the content of the band data (for example, the presence of image data). Accordingly, the JPEG encoding circuit 12 adds padding data to the compressed band data so that the size of the compressed band data is equal to an integral multiple of a unit size (for example, 128 bytes or 32 bytes) when the compressed band data is read out from the buffer area 31 and writes the compressed band data to which the padding data is added in the buffer area 31. The padding data is predetermined constant data and is added to adjust the data length of the compressed band data.

In Step S3, the JPEG encoding circuit 12 determines which position in the boundary area 32 the writing address indicates each time one piece of compressed band data is written in the buffer area 31. Specifically, the JPEG encoding circuit 12 determines whether the size of the area from the position of the writing address to the end of the buffer area 31 is smaller than the maximum size of the amount of one piece of compressed band data.

Figure 4:
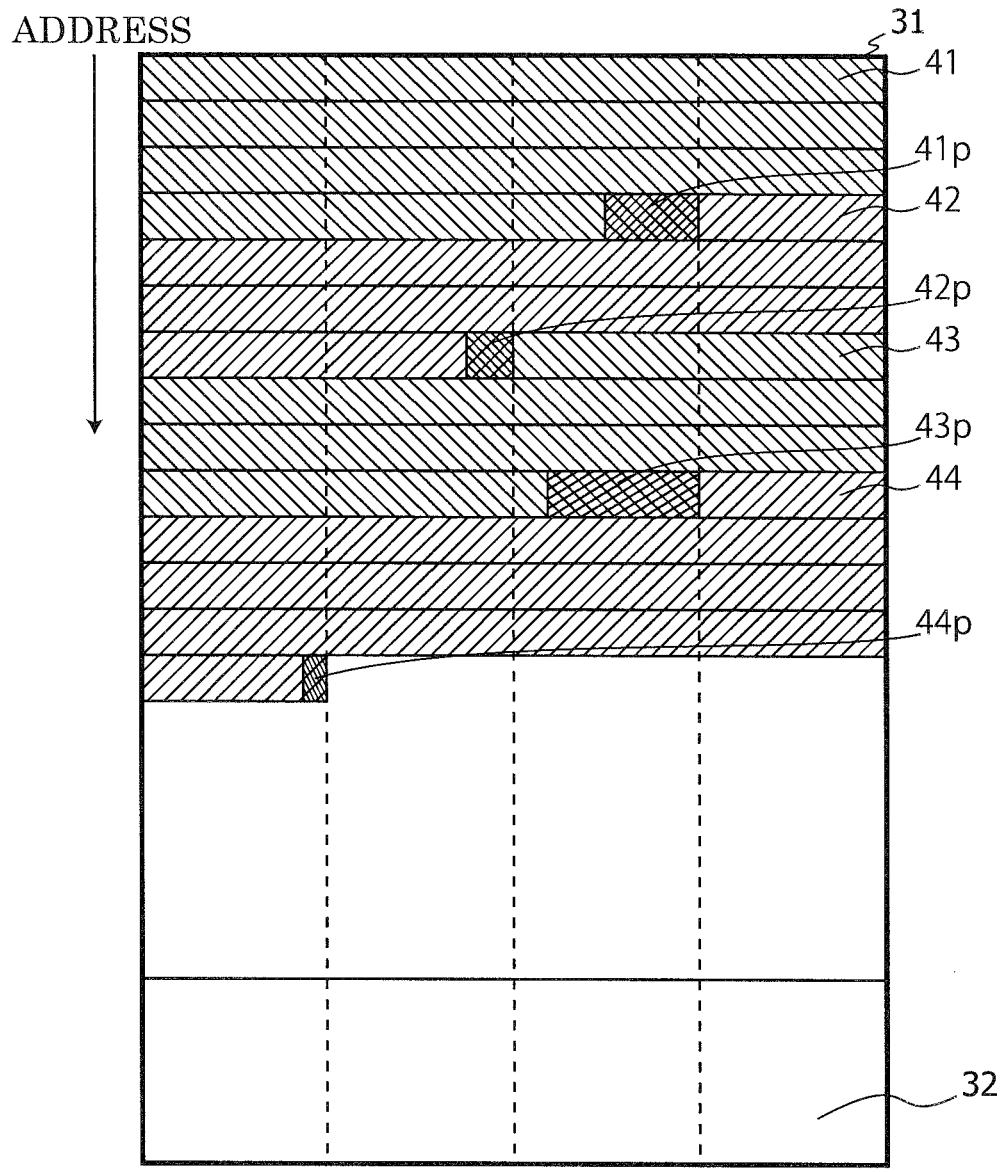
FIG. 4 illustrates a state in which the writing address does not reach a boundary area in the buffer area illustrated in FIG. 2.
Figure 5:
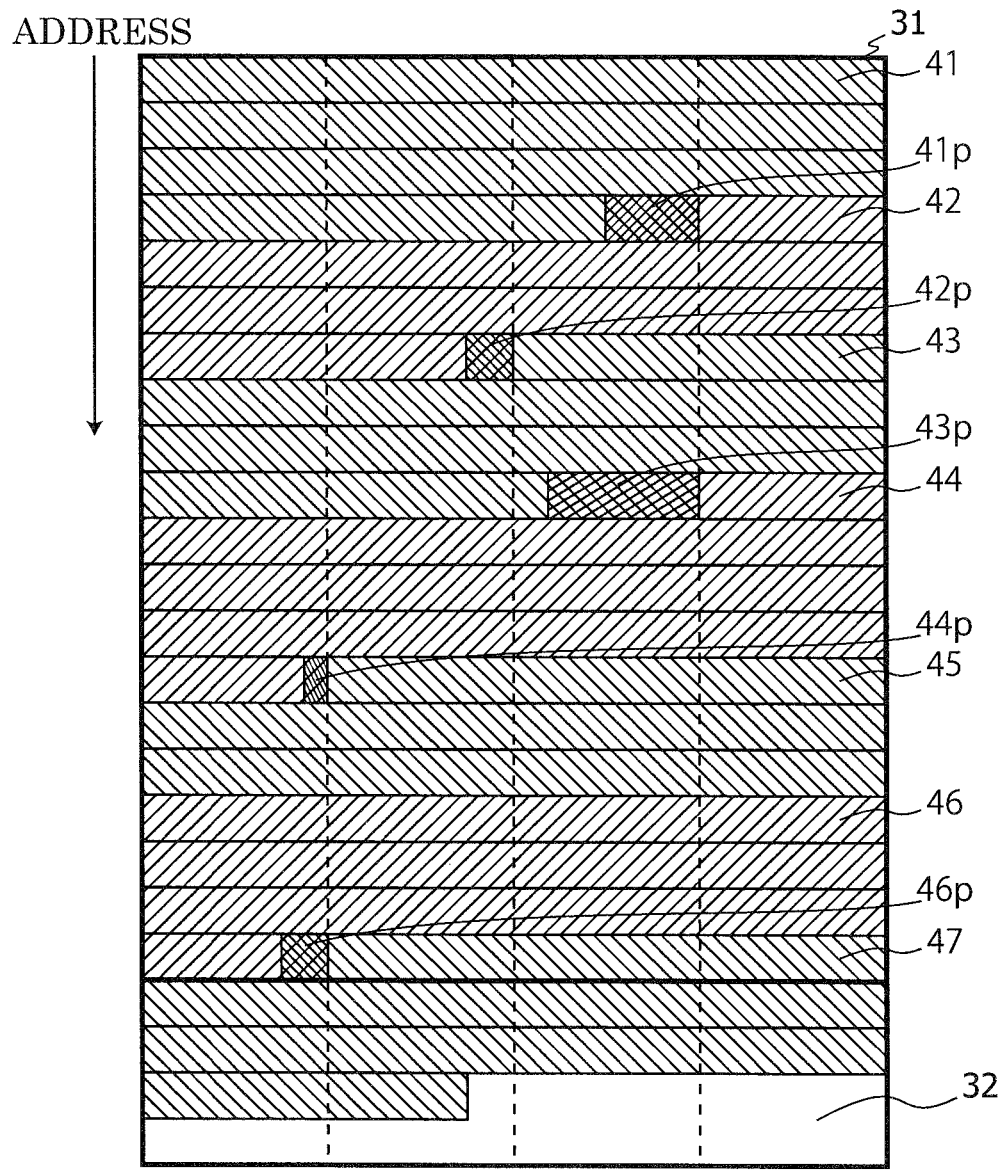
FIG. 5 illustrates a state in which the writing address reaches the boundary area in the buffer area illustrated in FIG. 2.

FIG. 4 illustrates a state in which the writing address does not reach the boundary area 32 in the buffer area 31 shown in FIG. 2. FIG. 5 illustrates a state in which the writing address reaches the boundary area 32 in the buffer area 31 shown in FIG. 2.

If the JPEG encoding circuit 12 determines that the writing address does not indicate a position in the boundary area 32 ("NO" in Step S3), the process goes back to Step S2. In Step S2, the JPEG encoding circuit 12 writes the subsequent compressed band data from the writing address.

For example, in the state illustrated in FIG. 4, four pieces of padding data 41$p$, 42$p$, 43$p$ and 44$p$ are added to four pieces of compressed band data 41, 42, 43 and 44, respectively, to sequentially fill the buffer area 31 with the data. The ending position of the last piece of compressed band data 44 (that is, the position indicated by the writing address immediately after the piece of compressed band data 44 is written) does not reach the boundary area 32. Accordingly, the JPEG encoding circuit 12 determines that the writing address does not indicate a position in the boundary area 32.

In Step S4, if the JPEG encoding circuit 12 determines that the writing address indicates any position in the boundary area 32 ("YES" in Step S3), the JPEG encoding circuit 12 resets the writing address to the initial value (the first address of the buffer area 31). Then, the process goes back to Step S2. In Step S2, the JPEG encoding circuit 12 writes the subsequent compressed band data from the first address of the buffer area 31. Although the previous compressed band data is overwritten when the subsequent compressed band data is written from the first address of the buffer area 31, the downstream processing circuit reads out the previous compressed band data before the overwriting.

For example, in the state shown in FIG. 5, three additional pieces of compressed band data 45, 46 and 47 are written in the buffer area 31, compared with the state illustrated in FIG. 4. A piece of padding data 46$p$ is added to the piece of compressed band data 46. In the state illustrated in FIG. 5, the buffer area 31 is sequentially filled with the seven pieces of compressed band data 41, 42, 43, 44, 45, 46 and 47. The ending position of the final piece of compressed band data 47 (that is, the position indicated by the writing address immediately after the piece of compressed band data 47 is written) reaches the boundary area 32. Accordingly, the JPEG encoding circuit 12 determines that the writing address indicates any position in the boundary area 32.

The downstream processing circuit (for example, the HDD controller 13 or another image processing circuit) sequentially reads out the compressed band data in units of a predetermined data size from the buffer area 31. The downstream processing circuit reads out each piece of compressed band data before the piece of compressed band data is overwritten by the subsequent piece of compressed band data. The downstream processing circuit calculates a readout address indicating the position where the compressed band data is read out and advances the readout address each time when the compressed band data is read out from the first address of the buffer area 31. If the readout address indicates any position in the boundary area 32, the downstream processing circuit resets the readout address to the first address of the buffer area 31 and reads out the subsequent compressed band data from the beginning of the buffer area 31.

As described above, according to the above embodiment, the RAM 14 includes the buffer area 31 of a fixed length. The JPEG encoding circuit 12 sequentially performs the variable-length encoding on the multiple pieces of band data and sequentially writes the compressed band data from the beginning of the buffer area 31. If the end of the compressed band data is positioned in the boundary area 32, the JPEG encoding circuit 12 writes the subsequent compressed band data from the beginning of the buffer area 31.

With the above operation, all the pieces of data composing the band data subjected to the variable-length encoding are constantly stored at successive addresses. Accordingly, it is possible to continuously write or read out the data corresponding to one band in the same address calculation (or one address calculation), thus preventing a delay in the writing and readout of the band data subjected to the encoding.

The present invention includes various other embodiments. For example, other designs can be used in which the above-described components are employed.

Although the JPEG format is used as the variable-length encoding method in the above embodiment, another format may be used.

The padding data is added to adjust the data length of the compressed band data in the above embodiment. However, instead of using the padding data, the compressed band data may be written without adjusting the data length of the compressed band data. The first address of the compressed band data to be subsequently written may be identified by a calculation using the size of the compressed band data, the writing of which is last completed, and the unit size (for example, 32 bytes) at the time when the compressed band data is read out from the buffer area 31. For example, the first address of the compressed band data to be subsequently written may be calculated by using a ceiling function according to the following equation. The ceiling function returns a smallest number that is larger than or equal to a first argument and that is a multiple of a second argument.

(First address of subsequent compressed band data)
=ceiling (start address+size of compressed band data the writing of which is last completed and unit size)

The image processing circuit 11, the JPEG encoding circuit 12, the HDD controller 13, and the other processing circuits connected to the bus 15 in the above embodiment are composed of Application Specific Integrated Circuits (ASICs).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image processing apparatus that performs image processing on band data, the apparatus comprising:
a memory configured to comprise a buffer area of a fixed length; and
a variable-length encoding circuit configured to sequentially perform variable-length encoding on the band data, sequentially write the band data subjected to the encoding from the beginning of the buffer area, and write subsequent band data subjected to the encoding from the beginning of the buffer area when the end of the band data subjected to the encoding is positioned in a boundary area including an ending part of the buffer area;
wherein the variable-length encoding circuit adds padding data to the band data subjected to the encoding so that the size of the band data subjected to the encoding is equal to an integral multiple of a unit size when the band data subjected to the encoding is read out from the buffer area and writes the band data to which the padding data is added in the buffer area.

2. The image processing apparatus according to claim 1, wherein the variable-length encoding circuit comprises an input Direct Memory Access (DMA) controller configured to read out the band data and an output DMA controller configured to write the band data subjected to the encoding.

3. The image processing apparatus according to claim 2, wherein the variable-length encoding circuit performs the encoding while sequentially reading out the band data with the input DMA controller and writes the band data subjected to the encoding with the output DMA controller.

4. The image processing apparatus according to claim 1, wherein part of a storage area or the entire storage area of the memory is allocated as the buffer area in advance.

5. The image processing apparatus according to claim 1, wherein the size of the buffer area or the size of the boundary area is set on the basis of a data compression ratio in the variable-length encoding circuit.

6. The image processing apparatus according to claim 1, wherein the size of the boundary area is larger than or equal to a maximum size of the band data subjected to the encoding.

7. The image processing apparatus according to claim 1, wherein the variable-length encoding circuit calculates a writing address when the band data subjected to the encoding is written in the buffer area.

8. The image processing apparatus according to claim 7, wherein the variable-length encoding circuit sets the writing address to an initial value upon starting of the writing of the band data subjected to the encoding and writes the band data subjected to the encoding so as to be continuous in the buffer area and advances the writing address by the amount corresponding to the written data.

9. The image processing apparatus according to claim 8, wherein the variable-length encoding circuit determines whether the writing address indicates any position in the boundary area each time that the band data subjected to the encoding is written.

10. The image processing apparatus according to claim 9, wherein the variable-length encoding circuit writes the subsequent band data subjected to the encoding from the writing address when the variable-length encoding circuit determines that the writing address does not indicate a position in the boundary area and sets the writing address to the initial value when the variable-length encoding circuit determines that the writing address indicates any position in the boundary area.

11. The image processing apparatus according to claim 1, wherein the variable-length encoding circuit encodes and compresses the band data in a Joint Photographic Experts Group (JPEG) format.

12. The image processing apparatus according to claim 1, further comprising:
one or more processing circuits downstream of the variable-length encoding circuit,
wherein the one or more processing circuits read out the band data subjected to the encoding from the buffer area before the band data subjected to the encoding is overwritten with subsequent band data subjected to the encoding.

13. The image processing apparatus according to claim 12, wherein the one or more processing circuits calculate a readout address indicating the position where the band data subjected to the encoding is read out, advances the readout address each time that the band data subjected to the encoding is read out from the beginning of the buffer area, sets the readout address to a first address of the buffer area when the readout address indicates any position in the boundary area, and reads out the subsequent band data subjected to the encoding from the beginning of the buffer area.

14. An image processing method performing image processing on band data, the method comprising:
an encoding step of sequentially performing variable-length encoding on the band data; and
a writing step of sequentially writing the band data subjected to the encoding from the beginning of a buffer area having a fixed length in a memory and writing subsequent band data subjected to the encoding from the beginning of the buffer area when the end of the band data subjected to the encoding is positioned in a boundary area including the end of the buffer area,
wherein the writing step adds padding data to the band data subjected to the encoding so that the size of the band data subjected to the encoding is equal to an integral multiple of a unit size when the band data subjected to the encoding is read out from the buffer area and writes the band data to which the padding data is added in the buffer area.

15. The image processing method according to claim 14, wherein the size of the buffer area or the boundary area is set on the basis of a data compression ratio in the encoding step.

16. The image processing method according to claim 14, wherein the size of the boundary area is larger than or equal to a maximum size of the band data subjected to the encoding.

17. An image processing apparatus that performs image processing on band data, the apparatus comprising:
means for storing a buffer area of a fixed length;
means for performing variable-length encoding on the band data;
means for sequentially writing the band data subjected to the encoding from the beginning of the buffer area;
means for writing subsequent band data subjected to the encoding from the beginning of the buffer area when the end of the band data subjected to the encoding is positioned in a boundary area including an ending part of the buffer area;
means for calculating a writing address when the band data subjected to the encoding is written in the buffer area; and
means for determining whether the writing address indicates any position in the boundary area each time that the band data subjected to the encoding is written.

18. An image processing apparatus that performs image processing on band data, the apparatus comprising:
a memory configured to comprise a buffer area of a fixed length; and
a variable-length encoding circuit configured to sequentially perform variable-length encoding on the band data, sequentially write the band data subjected to the encoding from the beginning of the buffer area, and write subsequent band data subjected to the encoding from the beginning of the buffer area when the end of the band data subjected to the encoding is positioned in a boundary area including an ending part of the buffer area,
wherein the variable-length encoding circuit calculates a writing address when the band data subjected to the encoding is written in the buffer area,
wherein the variable-length encoding circuit sets the writing address to an initial value upon starting of the writing of the band data subjected to the encoding and writes the band data subjected to the encoding so as to be continuous in the buffer area and advances the writing address by the amount corresponding to the written data, and
wherein the variable-length encoding circuit determines whether the writing address indicates any position in the boundary area each time that the band data subjected to the encoding is written.

19. The image processing apparatus according to claim 18, wherein the variable-length encoding circuit writes the subsequent band data subjected to the encoding from the writing address when the variable-length encoding circuit determines that the writing address does not indicate a position in the boundary area and sets the writing address to the initial value when the variable-length encoding circuit determines that the writing address indicates any position in the boundary area.

20. An image processing apparatus that performs image processing on band data, the apparatus comprising:
a memory configured to comprise a buffer area of a fixed length;
a variable-length encoding circuit configured to sequentially perform variable-length encoding on the band data, sequentially write the band data subjected to the encoding from the beginning of the buffer area, and write subsequent band data subjected to the encoding from the beginning of the buffer area when the end of the band data subjected to the encoding is positioned in a boundary area including an ending part of the buffer area; and
one or more processing circuits downstream of the variable-length encoding circuit,
wherein the one or more processing circuits read out the band data subjected to the encoding from the buffer area before the band data subjected to the encoding is overwritten with subsequent band data subjected to the encoding, and wherein the one or more processing circuits calculate a readout address indicating the position where the band data subjected to the encoding is read out, advances the readout address each time that the band data subjected to the encoding is read out from the beginning of the buffer area, sets the readout address to a first address of the buffer area when the readout address indicates any position in the boundary area, and reads out the subsequent band data subjected to the encoding from the beginning of the buffer area.

\* \* \* \* \*